(12) United States Patent
Hallstrom et al.

(10) Patent No.: US 12,061,102 B2
(45) Date of Patent: Aug. 13, 2024

(54) SYSTEMS AND METHODS FOR IRRIGATION MONITORING AND LEAK DETECTION

(71) Applicant: FLORIDA ATLANTIC UNIVERSITY BOARD OF TRUSTEES, Boca Raton, FL (US)

(72) Inventors: Jason O. Hallstrom, Boca Raton, FL (US); Jiannan Zhai, Boca Raton, FL (US); Chancey Kelley, Lake Worth, FL (US); Michael Brown, San Antonio, TX (US); Andrew Van Zwieten, Huntington Beach, CA (US); Don Salamon, Piney Point, MD (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 544 days.

(21) Appl. No.: 16/610,331

(22) PCT Filed: Jun. 1, 2017

(86) PCT No.: PCT/US2017/035362
§ 371 (c)(1),
(2) Date: Nov. 1, 2019

(87) PCT Pub. No.: WO2018/222193
PCT Pub. Date: Dec. 6, 2018

(65) Prior Publication Data
US 2020/0080875 A1 Mar. 12, 2020

(51) Int. Cl.
*G01F 1/075* (2006.01)
*A01G 25/00* (2006.01)
(Continued)

(52) U.S. Cl.
CPC .............. *G01F 1/075* (2013.01); *A01G 25/00* (2013.01); *F03B 13/10* (2013.01);
(Continued)

(58) Field of Classification Search
CPC ..... G01F 1/075; G01F 15/0755; A01G 25/00; A01G 25/16; F03B 13/10; F03B 13/00;
(Continued)

(56) References Cited

U.S. PATENT DOCUMENTS 6,300,689 B1   10/2001   Smalser
8,294,292 B2   10/2012   Irwin et al.
(Continued)

OTHER PUBLICATIONS

International Search Report mailed Aug. 21, 2017 in PCT/US2017/035362.

*Primary Examiner* — Joseph Ortega
(74) *Attorney, Agent, or Firm* — Fox Rothschild LLP; Carol Thorstad-Forsyth

(57) ABSTRACT

Systems and methods for operating a fluid supply system. The methods comprise: using a micro-turbine and an Energy Harvesting Circuit ("EHC") to harvest energy from a fluid flowing through a pipeline; operating a switch to disconnect the EHC from the micro-turbine when an amount of energy harvested reaches a threshold value; detecting by a sensor device an amount of natural fluid flow through the pipeline while the EHC is disconnected from the micro-turbine; and operating the switch to reconnect the EHC to the micro-turbine after the amount of natural fluid flow has been detected.

19 Claims, 4 Drawing Sheets

(51) Int. Cl.
*F03B 13/10* (2006.01)
*G01F 15/075* (2006.01)
*G01M 3/28* (2006.01)
*H02K 7/18* (2006.01)
*H02K 11/26* (2016.01)
*A01G 25/16* (2006.01)

(52) U.S. Cl.
CPC ....... *G01F 15/0755* (2013.01); *G01M 3/2807* (2013.01); *H02K 7/1823* (2013.01); *H02K 11/26* (2016.01); *A01G 25/16* (2013.01)

(58) Field of Classification Search
CPC ... G01M 3/2807; H02K 7/1823; H02K 11/26; Y02E 10/20; F05B 2220/20; F05B 2220/602; F05B 2250/82; Y02B 10/50
See application file for complete search history.

(56) References Cited

U.S. PATENT DOCUMENTS

| | | | |
|---|---|---|---|
| 9,651,400 B2 | 5/2017 | Pitchford et al. | |
| 2008/0284174 A1* | 11/2008 | Nagler | F03B 13/105 290/52 |
| 2010/0305765 A1 | 12/2010 | Sutardja | |
| 2016/0025514 A1* | 1/2016 | Pitchford | G01D 4/006 290/52 |
| 2017/0059384 A1 | 3/2017 | Della-Monica | |

* cited by examiner

SYSTEMS AND METHODS FOR IRRIGATION MONITORING AND LEAK DETECTION

STATEMENT REGARDING FEDERAL FUNDING

The invention was made with government support under contract number CNS-1545705 awarded by the National Science Foundation. The government has certain rights in the invention.

CROSS REFERENCE TO RELATED APPLICATIONS

This U.S. Application is a National Phase Entry of PCT/US17/35362 filed on Jun. 1, 2017, entitled "SYSTEMS AND METHODS FOR IRRIGATION MONITORING AND LEAK DETECTION", the contents of which is incorporated herein by reference in its entirety.

FIELD

This document relates generally to fluid supply systems such as irrigation systems. More particularly, this document relates to systems and methods for fluid flow monitoring, leak detection and system optimization.

BACKGROUND

There are various conventional Sensor-Based Sprinkler (SBS) systems known in the art. One such conventional SBS system is a Rain Sensor Based Sprinkler (RSBS) system. The RSBS system comprises a rain sensor that is an electromechanical component configured for collecting fallen rain. The RSBS system controls the operation of sprinklers based on the amount of rain collected by the rain sensor. For example, if one inch (1") of rain is collected by the rain sensor, then the RSBS system will prevent or stop water from flowing from a water source to the sprinklers. In contrast, if a quarter inch (¼") of rain is collected by the rain sensor, then the RSBS system will send a control signal to a valve for allowing water to flow from the water source to the sprinklers.

SUMMARY

Systems and methods for operating a fluid supply system (e.g., an irrigation system) are disclosed herein. The methods comprise: using a micro-turbine and an Energy Harvesting Circuit ("EHC") to harvest energy from a fluid flowing through a pipeline; operating a switch to disconnect the EHC from the micro-turbine when an amount of energy harvested reaches a threshold value; detecting by a sensor device an amount of natural fluid flow through the pipeline while the EHC is disconnected from the micro-turbine; and operating the switch to reconnect the EHC to the micro-turbine after the amount of natural fluid flow has been detected.

In some scenarios, the micro-turbine is located along the pipeline adjacent to a sprinkler. The harvested energy is used to power at least one electronic component of the sensor device at least while the EHC is disconnected from the micro-turbine. The amount of natural fluid flow is detected by: counting a number of rotations of the micro-turbine that are caused by the flow of the fluid through the pipeline; and/or measuring a voltage level of an output from a generator comprising the micro-turbine.

In those or other scenarios, the method further involves determining whether the amount of natural fluid flow through the pipeline indicates that there has been a variation (e.g., decrease) of fluid flow by a certain percentage. The EHC can be reconnected to the micro-turbine when the amount of natural fluid flow through the pipeline does not indicate that there has been a variation (e.g., decrease) of fluid flow by a certain percentage. Alternatively or additionally, the EHC can be reconnected to the micro-turbine when an energy storage component (e.g., a capacitor) needs to be re-charged. A conclusion is made that a possible leak exists in the pipeline when the amount of natural fluid flow through the pipeline indicates that there has been a variation (e.g., decrease) of fluid flow by a certain percentage. At least one remedial measure is taken in response to a conclusion that the possible leak exists.

DESCRIPTION OF THE DRAWINGS

The present solution will be described with reference to the following drawing figures, in which like numerals represent like items throughout the figure.

DETAILED DESCRIPTION

Figure 1A:
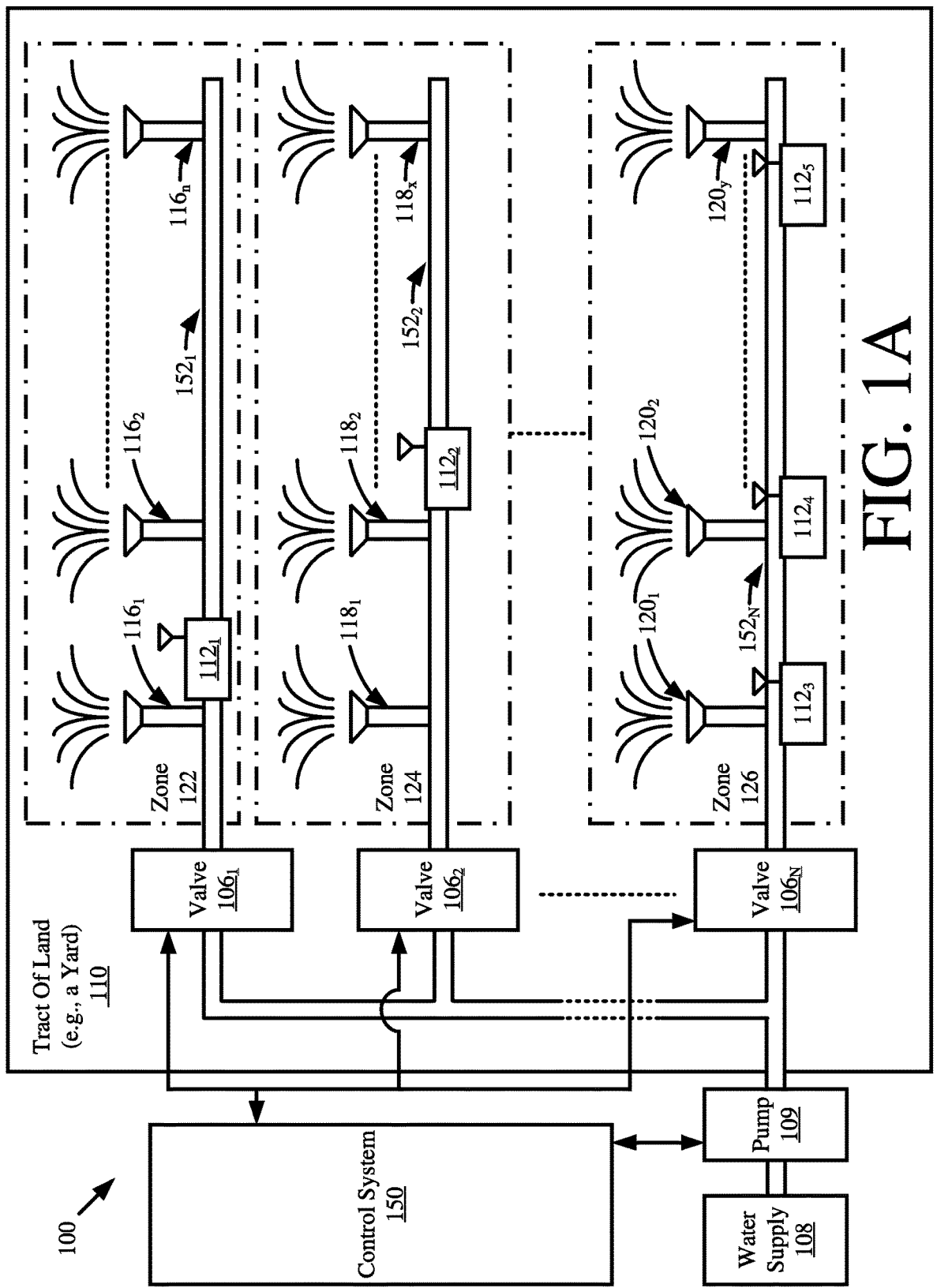
FIGS. 1A-1B (collectively referred to as "FIG. 1") provide an illustration of an illustrative irrigation or sprinkler system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Despite the advantages of the conventional irrigation systems described in the Background section of this document, they suffer from certain drawbacks. For example, none of the conventional irrigation systems are able to detect and/or localize leaks above or below ground. This drawback of the conventional irrigation systems is solved by the present solution.

The present solution concerns systems and methods for detecting leaks, either above ground or below ground, in residential and commercial irrigation systems. The system can be subdivided into an enabling device and a supporting algorithm. The enabling device comprises a battery-free wireless sensing platform intended for in-line installation. The enabling device simultaneously harvests energy from in-pipe fluid flows, and wirelessly reports data measurements of the fluid flows. The dual harvesting and measurement design is novel. It includes a new approach to achieving sensing accuracy, and a novel antenna mechanism. The supporting algorithm facilitates the detection of fluid flow anomalies across a multi-point monitoring field based on data collected from the sensing device. The resulting system comprises a field of sensing devices, a receiving station, and the supporting algorithm.

The present solution is described herein in terms of irrigation and sprinkler system applications in a plurality of venues. The venues include, but are not limited to, golf course applications, sports field applications, residential applications, park applications, farm applications, nursery applications, military applications, cemetery applications, city municipality applications, and/or theme park applications. The present solution is not limited in this regard. The present solution can be employed in any application in which leaks need to be detected in a pipeline. Accordingly, the present invention can be used in a variety of fluid supply system applications. Such application include scientific applications and/or chemical processing applications.

Illustrative Irrigation System

Referring now to FIG. 1A, there is provided a schematic illustration of an exemplary architecture for an irrigation system 100. The irrigation system 100 is generally configured to facilitate the monitoring of fluid flow (e.g., water flow) through the irrigation system while irrigating a tract of land (e.g., a yard) 110. As such, the irrigation system 100 comprises a water supply 108, a pump 109, a control system 150, at least one valve $106_1, 106_2, \ldots, 106_N$, a plurality of sprinklers $116_1, 116_2, \ldots, 116_n, 118_1, 118_2, \ldots, 118_x, 120_1, 120_2, \ldots, 120_y$, and at least one EHSD $112_1, 112_2, \ldots, 112_S$.

Figure 1B:
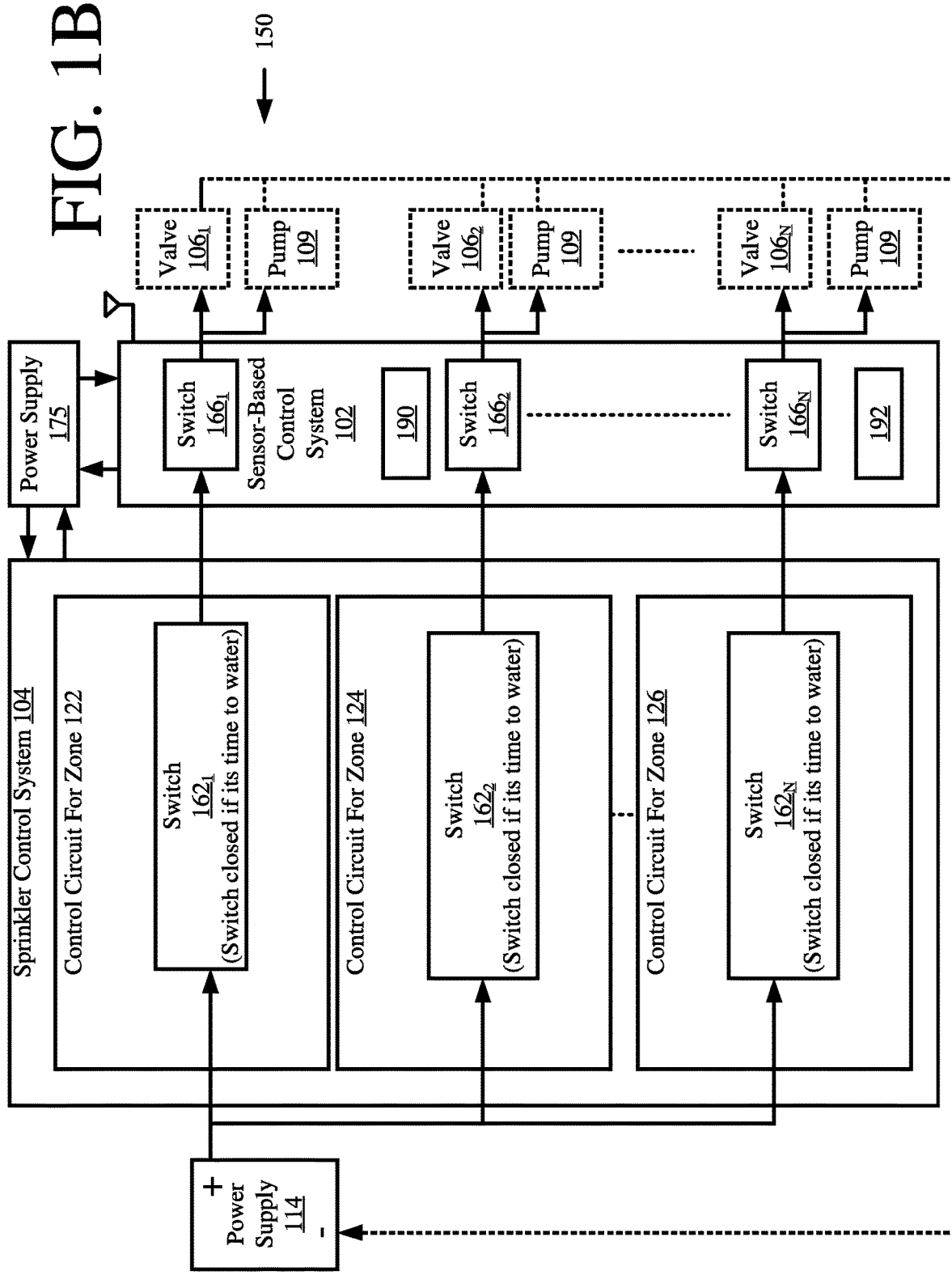

The control system 150 is generally configured to control the operation of the irrigation system 100. A detailed block diagram of an exemplary architecture of the control system 150 is provided in FIG. 1B. As shown in FIG. 1B, the control system 150 includes one or more power supplies 114, 175, a Sprinkler Control System (SCS) 104 and a Sensor-Based Control System (SBCS) 102.

The SCS 104 is generally configured to control the operations of the sprinkler system 100. The SCS 104 includes any single zone or multi-zone sprinkler control system that is known or to be known in the art. For example, the SCS 104 includes, but is not limited to, a sprinkler timer having a model number 57896 or 94881 which is available from Orbit Irrigation Products, Inc. of Bountiful, Utah.

As shown in FIG. 1B, the SCS 104 comprises a plurality of switches $162_1, 162_2, \ldots, 162_N$ coupled to a terminal of the power supply 114. Each switch is allocated to control operations of a particular zone 122, 124, 126 of the irrigation system 100. For example, switch $162_1$ comprises a control circuit for zone 122 of the irrigation system 100. Switch $162_2$ comprises a control circuit for zone 124 of the irrigation system 100. Switch $162_N$ comprises a control circuit for zone 126 of the irrigation system 100. Each of the switches $162_1, 162_2, \ldots, 162_N$ is normally in an open position. As such, each switch $162_1, 162_2, \ldots, 162_N$ is transitioned to a closed position when the SCS 104 determines that it is time to water all or a portion of a tract of land (e.g., a yard).

The SBCS 102 is configured to enable and disable normal operations of the irrigation system 100. In this regard, the SBCS 102 is disposed between the switches $162_1, 162_2, \ldots, 162_N$ of the SCS 104 and the valves $106_1, 106_2, \ldots, 106_N$ and/or pump 109. As shown in FIG. 1B, the SBCS 102 includes a plurality of switches $166_1, 166_2, \ldots, 166_N$ for controlling when the switches $162_1, 162_2, \ldots, 162_N$ of the SCS 104 are electronically connected to the valves $106_1, 106_2, \ldots, 106_N$ and/or pump 109.

When the switches $166_1, 166_2, \ldots, 166_N$ of the SBCS 102 are closed, normal operations of the irrigation system are enabled. In this scenario, power can be supplied from the power supply 114 to the valves $106_1, 106_2, \ldots, 106_N$ and/or pump 109. Each of the valves $106_1, 106_2, \ldots, 106_N$ includes, but is not limited to, an electromechanical valve (e.g., a solenoid valve). Each of the valves $106_1, 106_2, \ldots, 106_N$ is normally in a closed position. Therefore, each valve $106_1, 106_2, \ldots, 106_N$ transitions to an open position in response to a signal received from the SCS 104. In this scenario, water is allowed to flow from the water supply 108 to the sprinklers $116_1, 116_2, \ldots, 116_n, 118_1, 118_2, \ldots, 118_x, 120_1, 120_2, \ldots, 120_y$ of the respective zone(s) 122, 124, 126.

The SBCS 102 determines when to enable and disable normal operations of the irrigation system 100 based on sensor information received from the EHSDs $112_1, 112_2, \ldots, 112_S$. The sensor information includes, but is not limited to, measures of fluid flow, measures of turbine rotation, and/or information indicating that leak(s) has(have) been detected in one or more zones 122, 124, 126.

In FIG. 1A, the EHSDs $112_1, 112_2, \ldots, 112_S$ are disposed at least partially in the soil of one or more zones 122, 124, 126 of the tract of land 110. The depth at which the EHSDs $112_1, 112_2, \ldots, 112_S$ are buried in the soil depends on the particular application, as well as the transmitter technology implemented therein. For example, if an EHSD $112_1, 112_2, \ldots, 112_S$ implements a sub-gigahetz wireless communication technology, then the entire EHSD, except for an antenna, is buried in the ground.

As shown in FIG. 1A, EHSD $112_1$ is disposed in zone 122. EHSD $112_2$ is disposed in zone 124. EHSDs $112_3$, $112_4$, $112_5$ are disposed in zone 126. The present solution is not limited to this particular arrangement of EHSDs. The EHSDs $112_1, 112_2, \ldots, 112_5$ can be disposed at locations within the tract of land 110 that are selected in accordance with any particular application. In this regard, one or more EHSDs $112_1, 112_2, \ldots, 112_5$ can be disposed in each zone 122, 124, 126. Alternatively, at least one of the zones 122, 124, 126 can be absent of an EHSD.

Each EHSD $112_1, 112_2, \ldots, 112_5$ is disposed adjacent to or in proximity with a respective sprinkler $116_1, 116_2, \ldots, 116_n, 118_1, 118_2, \ldots, 118_x, 120_1, 120_2, \ldots, 120_y$. An EHSD need not be disposed at each sprinkler location along a given pipeline $152_1, 152_2, \ldots, 152_n$. As such, each pipeline can have zero, one or more EHSDs disposed therealong. For example, pipeline $152_1$ has one EHSD $112_1$ disposed thereon. Pipeline $152_2$ has one EHSD $112_2$ disposed thereon. Pipeline $152_N$ has a plurality of EHSDs $112_3$-$112_5$ disposed therealong. The present solution is not limited to the particulars of this example.

Each EHSD can be disposed before, under, or after the respective sprinkler along the pipeline, as shown in FIG. 1A. In some scenarios, the antenna of the EHSD is incorporated into the sprinkler. Such a configuration facilitates an added benefit of being able to detect when a sprinkler is broken or damaged. For example, if an EHSDs antenna is integrated with a sprinkler, then a determination can be made that the sprinkler is damaged when the antenna is unable to transmit signals therefrom (i.e., a remote communications device no longer receives signals from the EHSD). The present solution is not limited to the particulars of this example.

The EHSDs $112_1, 112_2, \ldots, 112_5$ will be described in detail below in relation to FIG. 2. However, it should be understood that the EHSDs $112_1, 112_2, \ldots, 112_5$ are generally configured to measure a natural fluid flow through the respective pipelines $152_1, 152_2, \ldots, 152_n$. After measuring the natural fluid flow, an EHSD $112_1, 112_2, \ldots, 112_5$ can perform certain operations. These operations can include, but are not limited to, the following operations: temporarily storing data representing the measured natural fluid flow; and transmitting the data to the SBCS 102 or other remote computing device (e.g., a server). The data is stored in the EHSD $112_1, 112_2, \ldots, 112_5$ in accordance with any particular format, such as a table format. In some scenarios, the EHSD $112_1, 112_2, \ldots, 112_5$ also transmits an identifier and/or timestamp to the SBCS 102 or other remote computing device (e.g., a server). The identifier includes a sequence of number, letters and/or symbols that is unique to the EHSD $112_1, 112_2, \ldots, 112_5$. In this scenario, the SBCS 102 may use the identifier to determine in which zone 122, 124, 126 the EHSD $112_1, 112_2, \ldots, 112_5$ is located. Based on such a determination, the SBCS 102 may disable operations of that zone when a leak is detected. Still, the present solution is not limited in this regard.

At the SBCS 102, the data is recorded and processed. The data can be recorded in a memory 192 of the SBCS 102. In some scenarios, the data can additionally or alternatively be stored in a memory of an external device (not shown). The external device includes, but is not limited to, a computing device and a remote database. The computing device includes, but is not limited to, a general purpose computer, a personal digital assistant, a cellular phone and a smart phone. In either scenario, the data is stored in accordance with a particular format. For example, the fluid flow data is stored in a table format so as to be associated with a time stamp and/or an identifier of an EHSD. The time stamp can represent a time when the data is received by the SBCS 102 or a time when a natural fluid flow is measured by the EHSD. The present solution is not limited in this regard.

Notably, the stored data can be accessed by a user at some future time for purposes of viewing and analyzing the same. In this regard, the SBCS 102 and/or external device (not shown) may restrict access to the stored information based on a user identifier, a password, at least one static biometric feature and/or access rights of the user or other user-authorized person. In some scenarios, the access restriction is achieved using an authentication technique. Authentication techniques are well known to those skilled in the art, and therefore will not be described herein.

Once a user has been authenticated, the SBCS 102 and/or external device (not shown) will retrieve all or a portion of the stored information from a respective memory (not shown). The retrieved information can be processed by the SBCS 102 and/or external device (not shown) for displaying one or more tables, graphs, statistical displays, preset parameter values and other information to the user. The other information can include, but is not limited to, recommendations for sprinkler replacement or pipeline repair. The information can be displayed to the user via a display screen of the SBCS 102 and/or external device (not shown). The tables, graphs and/or statistical displays can be stored in the memory of the SBCS 102 and/or external device (not shown). Alternatively, the tables, graphs and/or statistical displays can be discarded after the user has finished viewing the same.

Figure 2:
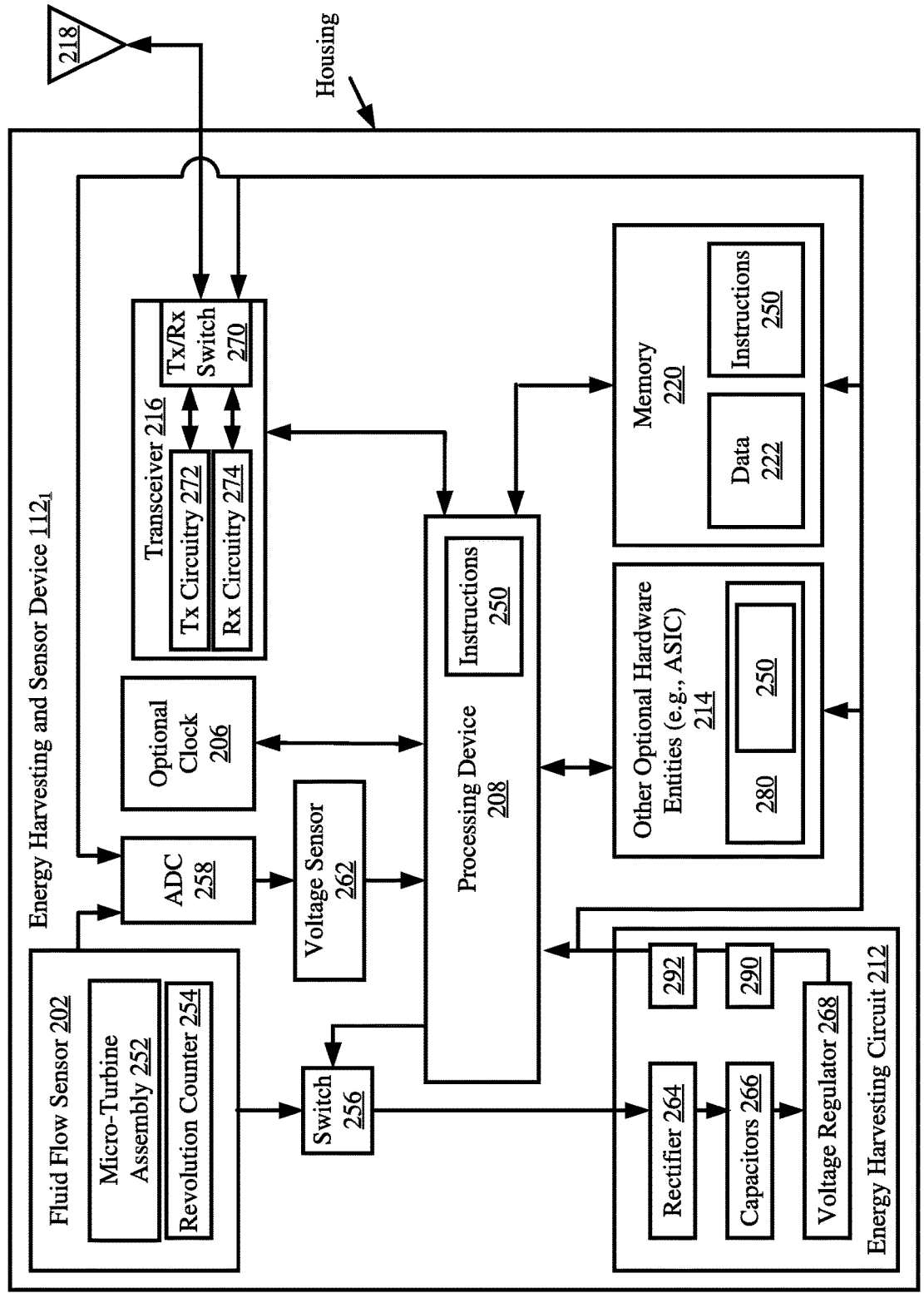
FIG. 2 provides an illustration of an illustrative architecture for the Energy Harvesting and Sensor Device(s) ("EHSD(s)") shown in FIG. 1.

Referring now to FIG. 2, there is provided a detailed block diagram of the EHSD $112_1$. The EHSDs $112_2, 112_3, \ldots, 112_5$ of FIG. 1A are the same as or substantially similar to the EHSD $112_1$. As such, the following discussion of EHSD $112_1$ is sufficient for understanding the EHSDs $112_2, 112_3, \ldots, 112_5$. Notably, the EHSD $112_1$ may include more or less components than those shown in FIG. 2. However, the components shown are sufficient to disclose an illustrative implementation of the present solution.

The hardware architecture of FIG. 2 represents one embodiment of a representative EHSD $112_1$ configured to facilitate the monitoring of fluid flow in a pipeline. As such, the EHSD $112_1$ implements at least a portion of a method for controlling an irrigation system in accordance with the present solution. Exemplary methods for controlling an irrigation system will be described below in relation to FIG. 3.

The EHSD $112_1$ provides a transiently-powered wireless sensing device that simultaneously monitors and harvests energy from the flow of fluid (e.g., water) through a pipeline. The EHSD $112_1$ automates the detection of underground leaks, which increase irrigation costs, waste freshwater resources, an comprise soil and structural stability.

As shown in FIG. 2, the EHSD $112_1$ includes an antenna 218 for receiving and transmitting signals. The antenna 218 can include, but is not limited to, a whip antenna, a wire antenna, or a ceramic chip antenna. The antenna 218 can be integrated in a sprinkler. In this case, the antenna 218 may be at least partially disposed in the main body and/or head of the sprinkler, and/or at least partially printed or deposited on an interior surface of the sprinkler using a conductive ink or other material (e.g., copper).

The antenna 218 is coupled to a transceiver 216. Transceivers are well known in the art, and therefore will not be described in detail herein. Any known or to be known transceiver can be used herein without limitation.

In some scenarios, the transceiver 216 includes, but is not limited to, a sub-gigahertz transceiver. The transceiver 216 comprises a receive/transmit (Rx/Tx) switch 270, transmitter (Tx) circuitry 272 and receiver (Rx) circuitry 274. The Rx/Tx switch 270 selectively couples the antenna 218 to the Tx circuitry 272 and Rx circuitry 274 in a manner familiar to those skilled in the art.

The Rx circuitry 274 decodes the signals received from an SBCS (e.g., the SBCS 102 of FIG. 1) to derive information therefrom. The Rx circuitry 274 provides decoded signal information to a processing device 208. The processing device 208 uses the decoded RF signal information in accordance with the function(s) of the EHSD $112_1$.

The processing device 208 also provides information to the Tx circuitry 272 for encoding information and/or modulating information into transmit signals. Accordingly, the processing device 208 is coupled to the Tx circuitry 272. The Tx circuitry 272 communicates the transmit signals to the antenna 218 for transmission to an external device (e.g., the SBCS 102 of FIG. 1).

As shown in FIG. 2, the EHSD $112_1$ further includes a fluid flow sensor 202, a switch 256, an Analog-to-Digital Converter ("ADC") 258, a voltage sensor 262, an optional clock 206, an Energy Harvesting Circuit ("EHC") 212, a processing device 208, a memory 220 and other optional hardware entities 214. The fluid flow sensor 202 is generally configured to detect an amount of fluid flow through a pipeline (e.g., pipeline $152_1$ of FIG. 1). The fluid flow may be measured in the unit of cubic feet per hour. The fluid flow is measured using a micro-turbine assembly 252 and a revolution counter 254. Micro-turbine assemblies and revolution counters are well known in the art, and therefore will not be described in detail herein. Any known or to be known micro-turbine assembly and/or revolution counter can be used herein without limitation.

In some scenarios, the revolution counter includes, but is not limited to, a dipole magnet disposed on a spindle of the micro-turbine assembly and a magnetic decoder installed on the top of a generator of the micro-turbine assembly. The revolution counter counts the number of turns made by the micro-turbine as a result of fluid passing therethrough. The number of turns indicates the amount of fluid flow at a given location along a pipeline.

In some scenarios, the amount of fluid flow is additionally or alternatively determined using the ADC 258 and voltage sensor 262. The Alternating Current ("AC") output of the micro-turbine 252 is fed to the ADC 258. The ADC 258 converts the AC output into a DC output. The DC output is then fed to the voltage sensor 262.

Voltage sensors are well known in the art, and therefore will not be described in detail herein. Any known or to be known voltage sensor can be used herein without limitation. In some scenarios, the voltage sensor 262 measures the voltage level of the DC output. The measured voltage level indicates the amount of fluid flow at a given location along a pipeline. The measured voltage level is then communicated to the processing device 208 and/or memory 220 for storage therein.

The micro-turbine's AC output is also used by the EHC 212. The EHC 212 comprises a rectifier 264, a capacitor array 266, and a voltage regulator 268. The AC output of the micro-turbine 252 is fed to the rectifier 264. Rectifiers are well known in the art, and therefore will not be described in detail herein. Still, it should be understood that the rectifier 264 converts alternating current into direct current by allowing a current to flow through it in one direction only. The rectifier includes any known or to be known rectifier, such as a full wave rectifier or a half wave rectifier. The rectifier can be implemented using transistors and/or diodes as is known in the art.

The rectifier's output is passed to the capacitors 266. The capacitors reduce voltage ripple, and supply a voltage to the voltage regulator 268. The voltage regulator 268 maintains a constant output voltage level. The constant output voltage of the voltage regulator 268 supplies energy to a super-capacitor array 290 for storage therein. The super-capacitor array 290 supplies power to at least components 208, 214, 216, 220, 258 of the EHSD $112_1$ via one or more voltage down converters 292. Voltage down converters are well known in the art, and therefore will not be described in detail herein. Any known or to be known voltage converter can be used herein without limitation. Notably, in some scenario, the super-capacitor array 290 can reside before voltage regulator 268.

The switch 256 is provided for selectively connecting and disconnecting the fluid flow sensor 202 from the EHC 212. The switch includes any known or to be known mechanical switch, electrical switch, or electromechanical switch that is able to open and close and electrical connection. During operation, it may be desirable to disconnect the fluid flow sensor 202 from the EHC 212 so that a natural flow of the fluid in the pipeline can be measured. In this regard, it should be understood that an electro-magnetic force is imposed on the micro-turbine when the EHC 212 is electrically coupled thereto. This electro-magnetic force effects the micro-turbines rotation despite the amount of fluid flowing therethrough. As such, the accuracy of the fluid flow measurement is varied (e.g., decreased) when the EHC 212 is harvesting energy from the fluid flow.

At least some of the hardware entities 214 perform actions involving access to and use of memory 220, which may be a Random Access Memory ("RAM") and/or any other suitable data storage device. Hardware entities 318 may also be configured for facilitating data communications. In this regard, the hardware entities 214 may include microprocessors, Application Specific Integrated Circuits ("ASICs") and other hardware.

The processing device 208 can access and run sensor applications installed on the sensor device $112_1$. At least one of the sensor applications is operative to perform data storage operations, data collection operations, data processing operations, and/or data communication operations.

The data storage operations of the processing device 208 can include, but are not limited to, the following operations: temporarily storing, in memory 220, data 222 representing the measured fluid flow. The data 222 is stored in memory 220 in accordance with any particular format. For example, the data 222 is stored in a table format.

The data collection operations of the processing device 208 can include, but are not limited to, the following operations: receiving information indicating the number of turns made by the micro-turbine detected by revolution counter 254 and/or a voltage level detected by voltage sensor 262; and/or processing the received information to generate binary data representing the amount of natural fluid flow as measured by the fluid flow sensor 202 and/or voltage sensor 262.

The data communication operations of the processing device 208 can include, but are not limited to, the following operations: wirelessly communicating data 222 to an external device (e.g., the SBCS 102 of FIG. 1); wireless communicating an identifier and/or timestamp generated by optional clock 206 to the external device; and/or receiving signals from the external device.

As shown in FIG. 2, the hardware entities 214 can include a computer-readable storage medium 280 on which is stored one or more sets of instructions 250 (e.g., software code) configured to implement one or more of the methodologies, procedures, or functions described herein. The instructions 250 can also reside, completely or at least partially, within the memory 220 and/or within the processing device 208 during execution thereof by the EHSD $112_1$. The memory 220 and the processing device 208 also can constitute machine-readable media. The term "machine-readable media", as used here, refers to a single medium or multiple media that store the one or more sets of instructions 250. The term "machine-readable media", as used here, also refers to any medium that is capable of storing, encoding or carrying a set of instructions 250 for execution by the EHSD $112_1$ and that cause the EHSD $112_1$ to perform any one or more of the methodologies of the present disclosure.

Illustrative Method for Operating a Fluid Supply System

Figure 3:
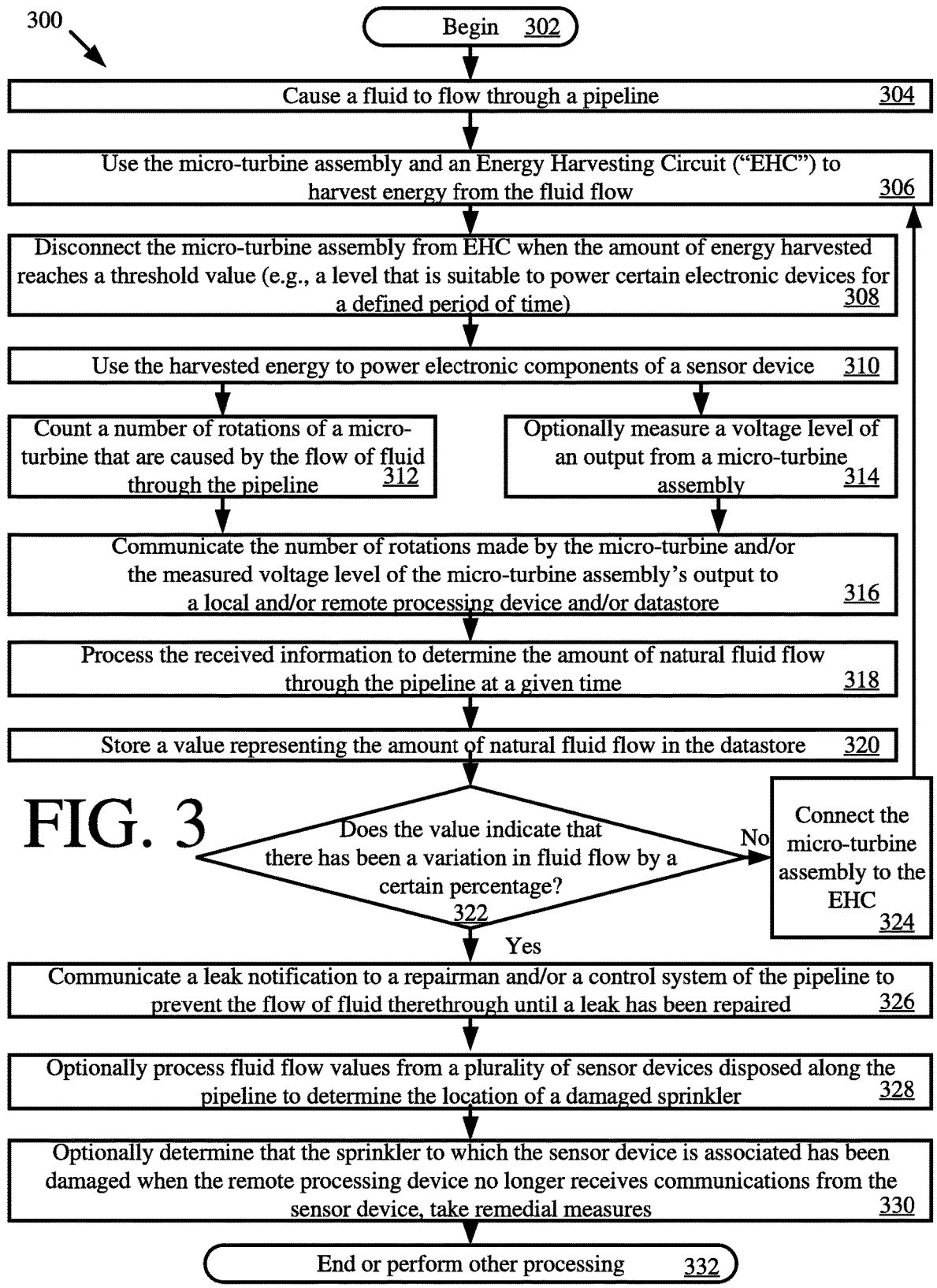
FIG. 3 is a flow diagram of an exemplary method for controlling an irrigation system.

Referring now to FIG. 3, there is provided a flow diagram of an exemplary method 300 for controlling an irrigation system (e.g., irrigation system 100 of FIG. 1). Method 300 begins with 302 and continues with 304 where a fluid (e.g., water) is caused to flow through a pipeline (e.g., pipeline $152_1$, $152_2$, . . . , or $152_n$ of FIG. 1). A micro-turbine assembly (e.g., micro-turbine assembly 252 of FIG. 2) and an EHC (e.g., EHC 212 of FIG. 2) are used in 306 to harvest energy from the fluid flow. In 308, the micro-turbine assembly is disconnected from the EHC when the amount of energy harvested reaches a threshold value. The disconnection can be achieved by changing a position of or activating a switch (e.g., switch 256 of FIG. 2) from a closed position to an open position. The switch position or device activation is controlled by a processing device (e.g., processing device 208 of FIG. 2) such as a microcontroller. The threshold value includes, but is not limited to, a level that is suitable to power certain electronic devices for a defined period of time. The harvested energy is used in 310 to power the electronic devices (e.g., electronic components 206, 208, 214, 216 and/or 220 of FIG. 2) of a sensor device (e.g., EHSD $112_1$, $112_2$, . . . , or $112_5$ of FIG. 1).

Next, operations are performed in 312-318 by the sensor device to determine an amount of natural fluid flow through the pipeline. These operations involve: counting a number of rotations of a micro-turbine that are caused by the flow of fluid through the pipeline (e.g., by a revolution counter 254 of FIG. 2); and/or measuring a voltage level of an output from the micro-turbine assembly (e.g., by a voltage sensor 262 of FIG. 2). This information is then communicated to a local processing device (e.g., processing device 208 of FIG. 2) and/or a remote processing device (e.g., a processor 190 of SBCS 102 shown in FIG. 1B or a remote server). The received information is processed to determine a value representing the amount of natural fluid flow through the pipeline. The value is then stored in a datastore (e.g., datastore 220 of FIG. 2, datastore 192 of FIG. 1B, or a remote database).

In 322, a decision is made as to whether or not the value indicates that there has been a variation (e.g., a decrease) in fluid flow through the pipeline by a certain percentage (e.g., >5%) during a given period of time or from a reference fluid flow value. If not [322:NO], then 324 is performed where the micro-turbine assembly is re-connected to the EHC and method 300 returns to 306 so that a next iteration of the above described process is performed.

If the value does indicate that there has been a variation (e.g., decrease) in fluid flow through the pipeline by a certain percentage [322:YES], then a leak notification is sent to a repairman and/or a control system (e.g., SBCS 102 shown in FIG. 1B) of the pipeline to prevent the flow of fluid therethrough until the leak has been repaired, as shown by 326. The position of the leak along the pipeline can optionally be determined in 328. This determination is made using natural fluid flow values for a plurality of sprinklers (e.g., sprinklers $116_1$, $116_2$, . . . , $116_n$, $118_1$, $118_2$, . . . , $118_x$, $120_1$, $120_2$, . . . , or $120_y$ of FIG. 1A). For example, in some scenarios, this determination is made through a time series analysis of fluid flows across the irrigation system to detect whether a fluid flow pattern is the same as or different than a known base fluid flow pattern. The present solution is not limited to the particulars of this example.

In some scenarios, the antenna (e.g., antenna 218 of FIG. 2) of the sensor device is disposed in or integrated with a sprinkler. Damage to the sprinkler can be detected based on the communications ability of the antenna. For example, if a remote device (e.g., SBCS 102 shown in FIG. 1B or a remote device) has not received a communication sent from the sensor device for a defined period of time, then the sprinkler associated with the sensor device is deemed damaged. Remedial measures can then be taken to repair or replace the sprinkler, as shown by 330. The remedial measures can include, but are not limited to, communicating a notification to a repairman or otherwise causing a repairman to be dispatched to the sprinkler's location. Upon completing 326, 328 or 330, 332 is performed where method 300 ends or other processing is performed (return to 306).

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method of operating a fluid supply system, comprising:
    converting, by a generator, mechanical energy of a micro-turbine which has been made to revolve by a fluid flowing through a pipeline to electric energy;
    using the electric energy to charge an energy storage device of an Energy Harvesting Circuit (EHC);
    operating a switch to open an electrical connection between the energy storage device of the EHC and the micro-turbine when an amount of said electric energy being stored during charging of the energy storage device reaches a threshold value, wherein the threshold value represents an amount of electric energy needed to power at least a sensor device electrically connected to the EHC, and the micro-turbine is disconnected from the energy storage device when the electrical connection is open such that the energy storage device is no longer being charged using the electric energy;

detecting by the sensor device an amount of natural fluid flow through the pipeline while the electrical connection between the energy storage device of the EHC and the micro-turbine is open;

operating the switch to close the electrical connection between the energy storage device of the EHC and the micro-turbine after the amount of natural fluid flow has been detected, wherein the micro-turbine is reconnected to the energy storage device when the electrical connection is closed such that the energy storage device is once again able to be charged using the electric energy; and using an antenna for a dual purpose of (i) communicating information from the EHC to a remote device and (ii) concurrently detecting physical damage to the antenna and a sprinkler;

wherein the EHC is located along the pipeline adjacent to the sprinkler, and the antenna is electrically connected to the EHC and integrated into the sprinkler such that the antenna at least partially resides within a head or main body of the sprinkler.

2. The method according to claim 1, wherein the fluid supply system comprises an irrigation system.

3. The method according to claim 1, further comprising using the electric energy to power at least one electronic component of the sensor device at least while the EHC is disconnected from the micro-turbine.

4. The method according to claim 1, wherein the amount of natural fluid flow is detected by counting a number of rotations of the micro-turbine that are caused by the flow of the fluid through the pipeline.

5. The method according to claim 1, wherein the amount of natural fluid flow is detected based on an output a voltage signal from the generator.

6. The method according to claim 1, further comprising determining whether the amount of natural fluid flow through the pipeline indicates that there has been a variation of fluid flow.

7. The method according to claim 6, wherein the EHC is reconnected to the micro-turbine when the amount of natural fluid flow through the pipeline does not indicate that there has been a variation of fluid flow.

8. The method according to claim 6, further comprising concluding that a possible leak exists in the pipeline when the amount of natural fluid flow through the pipeline indicates that there has been a variation of fluid flow.

9. The method according to claim 8, further comprising taking at least one remedial measure in response to a conclusion that the possible leak exists, the remedial measure comprising outputting a notification or causing a person to be dispatched to the fluid supply system.

10. A fluid supply system, comprising:
a pipeline through which fluid is able to flow;
a device comprising:
  a micro-turbine assembly comprising a generator configured to convert mechanical energy of a micro-turbine to electric energy as the micro-turbine is caused to rotate by the fluid while flowing through the pipeline;
  an Energy Harvesting Circuit ("EHC") electrically connected to the micro-turbine assembly and comprising an energy storage device configured to be charged by the electric energy;
  a switch operative to selectively open an electrical connection between the EHC and the micro-turbine assembly when an amount of said electric energy being stored during charging of the energy storage device reaches a threshold value, the threshold value representing an amount of electric energy needed to power at least a sensor device electrically connected to the EHC; and
  an antenna having a dual purpose of (i) communicating information from the EHC to a remote device and (ii) concurrently detecting physical damage to the antenna and a sprinkler, the antenna being integrated with the sprinkler such that the antenna at least partially resides within a head or main body of the sprinkler;
wherein the micro-turbine assembly is disconnected from the EHC when the electrical connection is open such that the electric energy is unable to be used to charge the energy storage device of the EHC;
wherein the sensor device is configured to detect an amount of natural fluid flow through the pipeline while the electrical connection between the EHC and the micro-turbine assembly is open; and
wherein the switch is operated to close the electrical connection after the amount of natural fluid flow has been detected, the micro-turbine assembly being reconnected to the EHC when the electrical connection is closed such that the electric energy is able to be used to charge the energy storage device of the EHC.

11. The fluid supply system according to claim 10, wherein the fluid supply system comprises an irrigation system.

12. The fluid supply system according to claim 10, wherein the electric energy is used to power at least one electronic component of the sensor device at least while the EHC is disconnected from the micro-turbine.

13. The fluid supply system according to claim 10, wherein the amount of natural fluid flow is detected by counting a number of rotations of the micro-turbine that are caused by the flow of the fluid through the pipeline.

14. The fluid supply system according to claim 10, wherein the amount of natural fluid flow is detected based on an output voltage signal from the generator.

15. The fluid supply system according to claim 10, further comprising a processing circuit configured to determine whether the amount of natural fluid flow through the pipeline indicates that there has been a variation of fluid flow.

16. The fluid supply system according to claim 15, wherein the EHC is reconnected to the micro-turbine when the amount of natural fluid flow through the pipeline does not indicate that there has been a variation of fluid flow.

17. The fluid supply system according to claim 15, wherein the processing circuit is further configured to conclude that a possible leak exists in the pipeline when the amount of natural fluid flow through the pipeline indicates that there has been a variation of fluid flow.

18. The fluid supply system according to claim 17, wherein the processing device is further configured to take at least one remedial measure in response to a conclusion that the possible leak exists, the remedial measure comprising outputting a notification or causing a person to be dispatched to the fluid supply system.

19. The method according to claim 1, wherein the antenna is printed or deposited on an interior surface of the sprinkler using a conductive ink.

* * * * *